United States Patent [19]

Jones

[11] 4,227,309
[45] Oct. 14, 1980

[54] PIPELINE PIG HAVING GAUGING PLATE

[75] Inventor: Trevor C. Jones, Stroud, England

[73] Assignee: Underground Location Services Limited, Gloucestershire, England

[21] Appl. No.: 785,073

[22] Filed: Apr. 6, 1977

Related U.S. Application Data

[63] Continuation of Ser. No. 630,502, Nov. 10, 1975, abandoned.

[30] Foreign Application Priority Data

Dec. 21, 1974 [GB] United Kingdom ............... 55359/74

[51] Int. Cl.³ ........................... G01B 7/12; G01B 7/28
[52] U.S. Cl. ............................... 33/178 E; 33/178 F; 33/DIG. 13
[58] Field of Search ......... 33/125 B, DIG. 13, 178 F, 33/178 E; 338/6, 2; 73/88.5 SD

[56] References Cited

U.S. PATENT DOCUMENTS

| 2,656,613 | 10/1953 | Goble | 33/178 F |
| 2,771,685 | 11/1956 | Kinley | 33/178 F |
| 3,706,047 | 12/1972 | Gunzel | 73/88.5 SD |
| 3,830,100 | 8/1974 | Kamer | 73/88.5 SD |

Primary Examiner—Willis Little
Attorney, Agent, or Firm—Andrus, Sceales, Starke & Sawall

[57] ABSTRACT

A pipeline pig is equipped with a gauging plate which consists of a flexible disc having strain gauges secured thereto so as to be subject to deformation when the disc makes contact with an obstruction or deformation in the pipe wall. The strain gauges are connected in a bridge circuit which goes out of balance when the disc is deformed. The output of the bridge circuit is connected to means for producing an output signal when the disc is bent rapidly but not when it is bent slowly so as not to respond to slow deformation due to build-up of debris in front of the pig.

12 Claims, 4 Drawing Figures

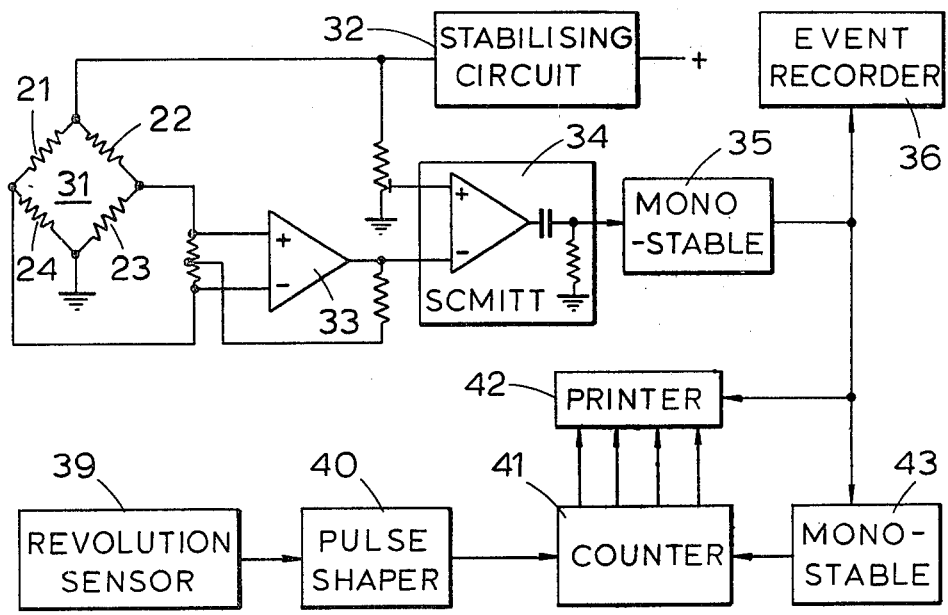
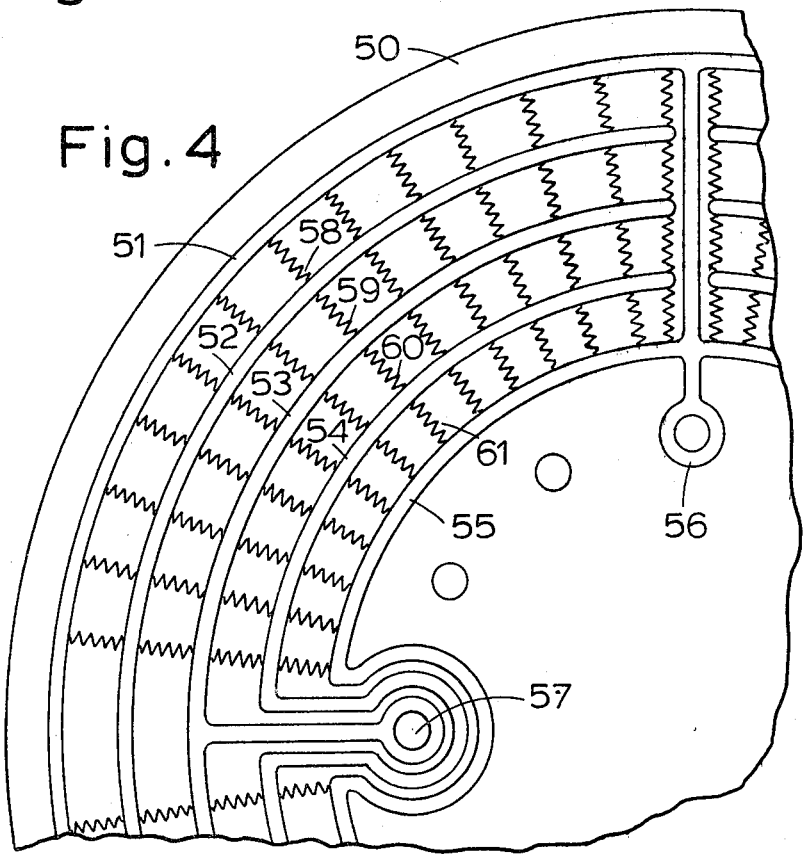
Fig. 3
Fig. 4

PIPELINE PIG HAVING GAUGING PLATE

This is a continuation application of Ser. No. 630,502, filed Nov. 10, 1975, now abandoned.

BACKGROUND OF THE INVENTION—FIELD OF THE INVENTION

This invention relates to gauging plates for pipeline testing tools of the kind commonly referred to as pigs.

BACKGROUND OF THE INVENTION—DESCRIPTION OF THE PRIOR ART

It is well known to use a gauging plate on a pig. Such a gauging plate commonly takes the form of a circular steel plate secured to the pig with its axis parallel to the direction of travel. The pig is propelled along the pipeline in the conventional way by pumping fluid into the pipe behind it. If the pig meets an obstruction or deformation in the pipe wall which reduces the effective diameter to less than that of the gauging plte, the pig lodges at such position, causing the fluid pressure to rise at the pumping station. This increase in pressure is used to provide an indication that the pig has met an obstruction. Such pigs commonly contain a magnetic pole structure so that they can then be located using magnetometers. However, when a large number of faults occur, this procedure is long and expensive because the pipe must be opened and the tool freed at every obstruction. Consequently, when a large number of faults are expected, it is more economical to use a data logging pig which can pass obstructions but record their position. The present invention is concerned with the provision of a gauging plate for use with a data logging pig.

SUMMARY OF THE PRESENT INVENTION

According to the invention, a gauging plate for a pipeline pig comprises a flexible disc having a plurality of strain gauges secured thereto, said strain gauges being radially oriented with respect to the centre of the disc.

Thus, in use, when a pig equipped with a gauging plate in accordance with the invention meets an obstruction of sufficient magnitude to cause the flexible disc to bend, strain gauges therein in the region where bending of the disc takes place produce an output signal indicating the presence of the deformation.

Preferably, the strain gauges are so spaced that there are a substantially equal number in each quadrant of the disc.

BRIEF DESCRIPTION OF THE DRAWING

Two embodiments of the invention will now be described by way of example with reference to the accompanying drawings in which:

FIG. 3 is a circuit diagram of an electronic circuit for the pig shown in FIG. 1, and FIG. 4 is an elevational view of one quadrant of a gauging plate in accordance with another embodiment of the invention.

DETAILED DESCRIPTION OF THE PREFERRED EMBODIMENT

Figure 1:
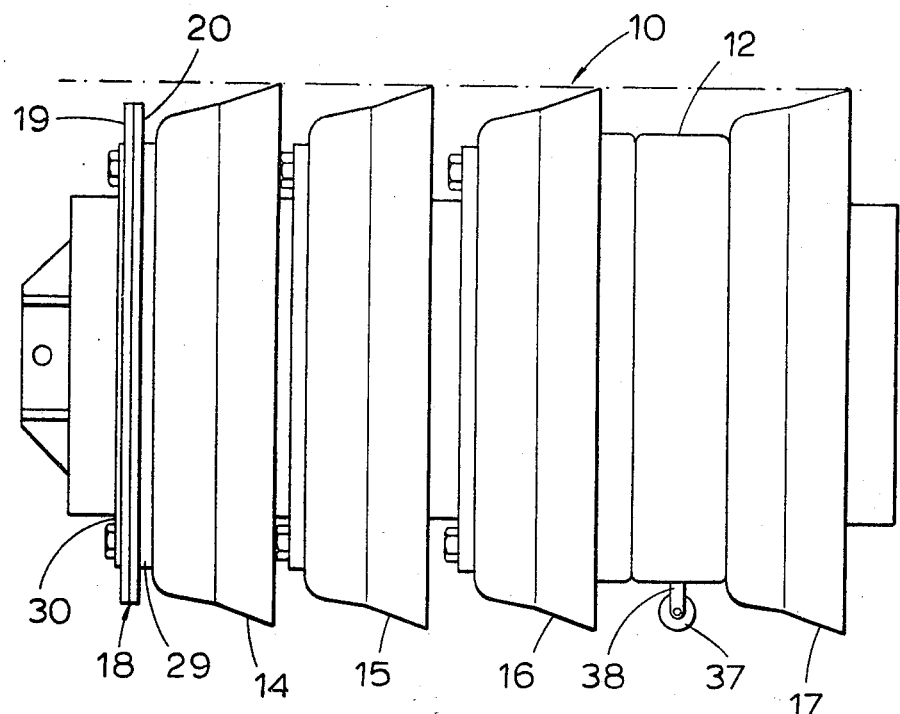
FIG. 1 is a side elevational view of a pig for use with a gauging plate in accordance with the invention.

Referring to FIG. 1, a pipeline pig 10 has a cylindrical body 12 of external diameter substantially less than the internal diameter of a pipe in which it is to be used. Four rubber cups 14 to 17 of substantially the same diameter as the internal diameter of the pipe are mounted on the cylindrical body 12, all facing in the same direction. These cups 14 to 17 serve as a plunger so that the pig can be propelled along the pipe by pumping fluid under pressure into one end and also maintain the pig with its cylindrical body substantially co-axial with the pipe. For this reason, the outer two cups 14 and 17 are located closely adjacent to opposite ends of the cylindrical body 12.

Figure 2:
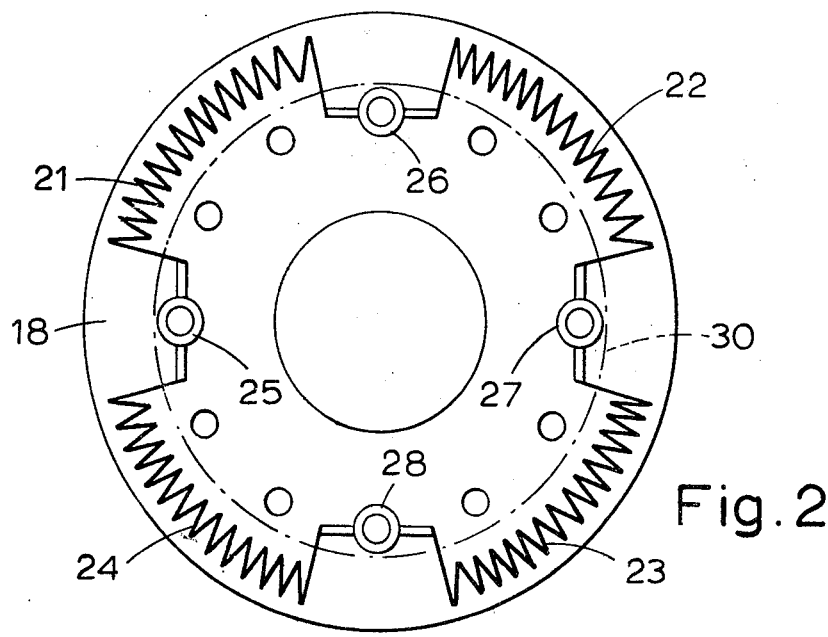
FIG. 2 is an elevational view of a flexible gauging plate in accordance with one embodiment of the invention.

A flexible gauging plate 18 in accordance with the invention is mounted on the cylindrical body in front of the foremost rubber cup. The gauging plate 18 comprises two moulded layers 19 and 20 of flexible material, for example polyurethane, with a flexible plastics film (not shown) bonded therebetween. The flexible plastics film has four groups of resistive strain gauges 21, 22, 23 and 24 bonded thereon in respective quadrants of an annular region adjacent to the periphery of the gauging plate as shown in FIG. 2. The strain gauges may be deposited on to the flexible film by evaporation. The strain gauges in each of the four groups 21 to 24 are connected in series with one another and the groups are interconnected so as to form a four arm bridge with respective terminal lands 25 to 28 deposited on the film at each of the junctions of the arms. A respective terminal post is soldered or spot-welded on to each of the four terminal lands and the entire assembly is bonded together by high-frequency or chemical welding. The gauging plate 18 is then attached to a fixed flange 29 on the pig 10, which has holes to accommodate the terminal posts, and clamped down by a detachable annulus plate 30 (shown in chain-dotted lines in FIG. 2). The external diameters of the fixed flange 29 on the pig 10 and the plate 30 are less than the internal diameter of the annular region on the flexible gauging plate 18 where the strain gauges are located.

Referring to FIG. 3, the strain gauge transducers 21 to 24 are connected in the four arms of a balanced bridge circuit 31 which is fed from a battery via a D.C. stabilising circuit 32. The output of the bridge is applied to a differential amplifier 33 having a sigmoid transfer characteristic, the output voltage remaining small until the input voltage reaches a predetermined value and then rising sharply to a substantially constant value for a range of larger input voltages. The output of the amplifier 33 is connected to a Schmitt trigger circuit 34, providing a trigger input to a monostable multivibrator 35 which is designed to trigger only on fast rise-time edges of the input waveform. Thus, slow variations due to build up of debris in front of the pig 10 do not produce any output. A rapid change, due to a change in pipe geometry, produces a narrow output pulse which can be recorded on a continuously running event recorder 36.

Alternatively or in addition, the output pulse from the monostable 35 can be used to initiate interrogation of a distance-run circuit. In order to provide an indication of distance travelled, a wheel 37 (FIG. 1) is attached to the cylindrical body 12 of the pig 10 by a spring-loaded mounting 38 so that the wheel 37 rides along the inside of the pipe wall. The wheel 37 incorporates a magnet, a cam device or a light reflector attached to it to give a distinct signal per revolution of the wheel.

The mounting 38 for the wheel 37 includes a sensor 39 (FIG. 3) responsive to the magnet, cam device or light reflector of the wheel. The output of the sensor 39 is applied via a pulse shaper 40 to a counter 41. The counter 41 is arranged to count the pulse from the sensor 39 and produces an output to a printer 42 which may constitute the total number of pulses counted. Alternatively, the counter 41 may include an arithmetic unit arranged to convert the pulse count into more conventional distance units such as meters.

The output from the monostable multivibrator 35 is connected to a control input of the printer 42 so that, on occurence of a pulse, the output of the counter 41 is recorded by the printer 42. In addition, the output of the monostable multivibrator 35 is connected via a second monostable multivibrator 43 to the reset input of the counter 41, the monostable multivibrator 43 providing sufficient delay to ensure that the printer 42 has completed its operation before the counter 41 is reset. Thus, the distances recorded by the printer 42 consitute the distances between successive irregularaties of the pipeline detected by the pig.

In order to guard against the possibility that the wheel 37 may slip, it is preferable to provide two such wheels on opposite sides of the cylindrical body 12, so as to engage with opposite sides of the pipeline. In normal operation, a pulse from the sensor associated with one of the wheels will be followed by a pulse from the sensor associated with the other. However, if one of the wheels should slip, two successive pulses may be received from the other wheel. The outputs of the two sensors are connected to a logic circuit so arranged that, if two successive pulses are received from one sensor without an intervening pulse from the other, an additional pulse is added to the output to compensate for the missing pulse from the sensor associated with the slipping wheel.

The cylindrical body 12 includes a sealed enclosure to protect the electronic circuitry from the environment in the pipeline and has a sealed cover plate (not shown) to provide access for instalation of equipment, replacement of batteries and removal of record charts.

Bending of the gauging plate 18 at one part of its periphery but not at another, as would take place when an obstruction is encountered, has the effect of putting the bridge circuit 31 out of balance. However, uniform flexing of the entire periphery of the gauging plate 18 such as might take place in the event of a pressure surge in the fluid in the pipe does not affect balance of the bridge.

The gauging plate 18 cannot be used to detect annular obstructions such as oversized butt welds at the joints between the pipe sections since such annular obstructions would cause uniform flexing of the entire periphery of the gauging plate. FIG. 4 illustrates a gauging plate 50 which is capable of detecting such annular obstructions. The annular region of the plate 50 outside the flange 29 and the annlus plate 30 contains five annular conductors 51 to 55 uniformly spaced radially thereacross. The inner and outer annular conductors 51 and 55 are both connected to a common terminal land 56. The annular conductor 53 is connected to a terminal land 57 and the remaining annular conductors 52 and 54 are connected to respective similar terminal lands (not shown).

A first group of strain gauges 58 is connected between the conductors 51 and 52, a second group of strain gauges 59 between the conductors 52 and 53, a third group of strain gauges 60 between the conductors 53 and 54, and a fourth group of strain gauges 61 between the conductors 54 and 55. There is an equal number of strain gauges in each group and the strain gauges are symmetrically disposed around the plate 50. Each group of strain gauges is connected in a respective arm of the bridge circuit 31 (FIG. 3) in place of the strain gauges 21 to 24.

When the disc 50 is subject to bending, the amount of strain will, except in the most unusual circumstances, not be uniform along any particular radius thereof and consequently the various groups of strain gauges will be subject to different amounts of strain and the bridge 31 would be put out of balance. Thus bending of any part or all of the periphery of the strain gauge 50 puts the bridge circuit 31 out of balance.

The flexible gauging plate fitted to a pig may readily be changed to allow the use of gauging plates of differing diameters and either as shown in FIG. 2 or as shown in FIG. 4. For example, it may be desired to make an initial pass with a pig with a gauging plate of diameter 10% less than the nominal internal diameter of the pipe to locate major deformities, then to make a pass with a plate 5% less than the nominal internal diameter of the pipe to detect other deformities which need remedying and finally to make a pass with a gauging plate of 2% less or even closer to the nominal internal diameter of the pipe to check the location of the butt welds along the pipe against their nominal locations on plans. For the last such pass, it will normally be necessary to use a gauging plate of the type shown in FIG. 4. In some circumstances, it may be preferable to use a gauging plate in accordance with the first embodiment of the invention for the other two passes.

In either embodiment of the invention, the strain gauges may be incorporated into the gauging plate during the moulding process instead of being evaporated onto a flexible film.

I claim:
1. A pipeline pig movable along a pipeline for detecting surface projections on the internal wall thereof which reduce the nominal internal cross-section of the pipeline by more than a predetermined amount comprising:
   a pig body
   a flexible disc of dimensions less by said predetermined amount than the nominal internal cross-section of the pipeline, said disc being mounted in its central region on said pig body so that the planar circular surfaces of said disc lie generally parallel to the cross-section of the pipeline;
   circular supporting means mounted on, and extending radially from, said pig body coaxially with said disc and having a radius larger than said disc for supporting said pig body in the pipeline with said disc substantially coaxial with the pipeline;
   a plurality of strain gauges secured to the peripheral region of said disc, said strain gauges being radially orientated outwardly with respect to the center of the disc; and
   circuit means coupled to the plurality of strain gauges and electrically responsive thereto for detecting bending of the peripheral region of said flexible disc responsive to striking internal surface projections.

2. A pipeline pig as claimed in claim 1 wherein said supporting means comprises plunger means adapted to make sliding sealing engagement with the pipeline for moving said pig along the pipeline responsive to the pumping of fluid behind the pig.

3. A pipeline pig as claimed in claim 1 in which the disc is divided into a plurality of sectors each containing a respective group of strain gauges coupled to said circuit means, the strain gauges in each group being connected in series with one another.

4. A pipeline pig as claimed in claim 1 which the strain gauges are disposed a plurality of annular regions concentric with the disc, each region containing a respective group of strain gauges coupled to said circuit means and the strain gauges in each group being connected in parallel to each other.

5. A pipeline pig as claimed in claim 3, in which said circuit means for detecting bending of the disc includes a bridge circuit with each group of strain gauges connected in a respective arm thereof.

6. A pipeline pig as claimed in claim 5, in which said flexible disc has four groups of strain gauges, each arm of the bridge circuit being formed by a respective group of strain gauges.

7. A pipeline pig as claimed in claim 6, in which the output of the bridge circuit is connected to means for producing an output signal when said flexible disc is bent rapidly but not when it is bent slowly.

8. A pipeline pig as claimed in claim 7, in which the means connected to the output of the bridge circuit includes a differential amplifier having a sigmoid transfer characteristic and a Schmitt trigger circuit, the input of which is connected to said amplifier.

9. A pipeline pig as claimed in claim 4, in which said circuit means for detecting bending of the disc includes a bridge circuit with each group of strain gauges connected in a respective arm thereof.

10. A pipeline pig as claimed in claim 9, in which said flexible disc has four groups of strain gauges, each arm of the bridge circuit being formed by a respective group of strain gauges.

11. A pipeline pig as claimed in claim 10, in which the output of the bridge circuit is connected to means for producing an output signal when said flexible disc is bent rapidly but not when it is bent slowly.

12. A pipeline pig as claimed in claim 11 in which the means connected to the output of the bridge circuit includes a differential amplifier having a sigmoid transfer characteristic and a Schmitt trigger circuit, the input of which is connected to said amplifier.

* * * * *